(12) United States Patent
Tan et al.

(10) Patent No.: US 8,441,813 B2
(45) Date of Patent: May 14, 2013

(54) MAXIMIZE EFFICIENCY METHOD FOR RESONANT CONVERTER WITH SELF-ADJUSTING SWITCHING POINTS

(75) Inventors: Allen Y. Tan, Taipei (TW); Hsian-Pei Yee, Taipei (TW); Cheng-Wen Tsui, Taipei (TW)

(73) Assignee: Sync Power Corp., Taipei (TW)

( * ) Notice: Subject to any disclaimer, the term of this patent is extended or adjusted under 35 U.S.C. 154(b) by 212 days.

(21) Appl. No.: 13/160,184

(22) Filed: Jun. 14, 2011

(65) Prior Publication Data
US 2012/0320635 A1    Dec. 20, 2012

(51) Int. Cl.
*H02M 3/335*    (2006.01)
(52) U.S. Cl.
USPC ....................................................... 363/21.03
(58) Field of Classification Search ............... 363/21.01, 363/21.02, 21.03, 21.04, 21.09, 21.1, 21.11, 363/21.12, 21.17, 21.18, 97, 131
See application file for complete search history.

(56) References Cited

U.S. PATENT DOCUMENTS

| | | | | |
|---|---|---|---|---|
| 6,674,655 B2* | 1/2004 | Giannopoulos et al. | ... | 363/21.01 |
| 6,958,920 B2* | 10/2005 | Mednik et al. | ................... | 363/19 |
| 7,426,120 B2* | 9/2008 | Yang et al. | ................. | 363/21.15 |
| 8,085,027 B2* | 12/2011 | Lin et al. | ........................ | 323/300 |
| 8,363,429 B2* | 1/2013 | Tzeng et al. | ................ | 363/21.03 |
| 2012/0306406 A1* | 12/2012 | Grisamore et al. | ........... | 315/294 |

* cited by examiner

*Primary Examiner* — Gary L Laxton
(74) *Attorney, Agent, or Firm* — Muncy, Geissler, Olds & Lowe, PLLC

(57) ABSTRACT

A maximize efficiency method for resonant converter with self-adjusting switching points is disclosed. The method is operated by a resonant converter, which comprises a transformer and a field effect transistor (FET). When the transistor is turned on, energy is stored in the transformer. When the transistor is turned off, a resonant signal is generated at a drain of the transistor. At this time, a suitable trigger time has to be found to turn on the transistor, so as to reduce switching power loss. The method measures the slope of the resonant signal at the trigger time. This is used as a reference to adjust the next cycle's trigger time. If the slope is negative at the time of trigger, a delta time is added to the trigger time in the next cycle, If the slope is positive, a delta time is subtracted from the trigger time for the next cycle.

15 Claims, 5 Drawing Sheets

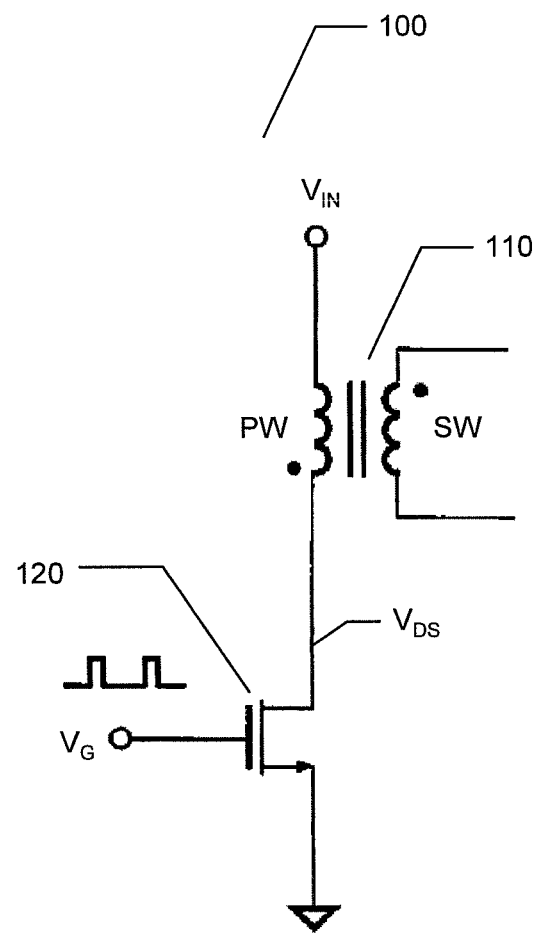
Figure 1A - Prior Art

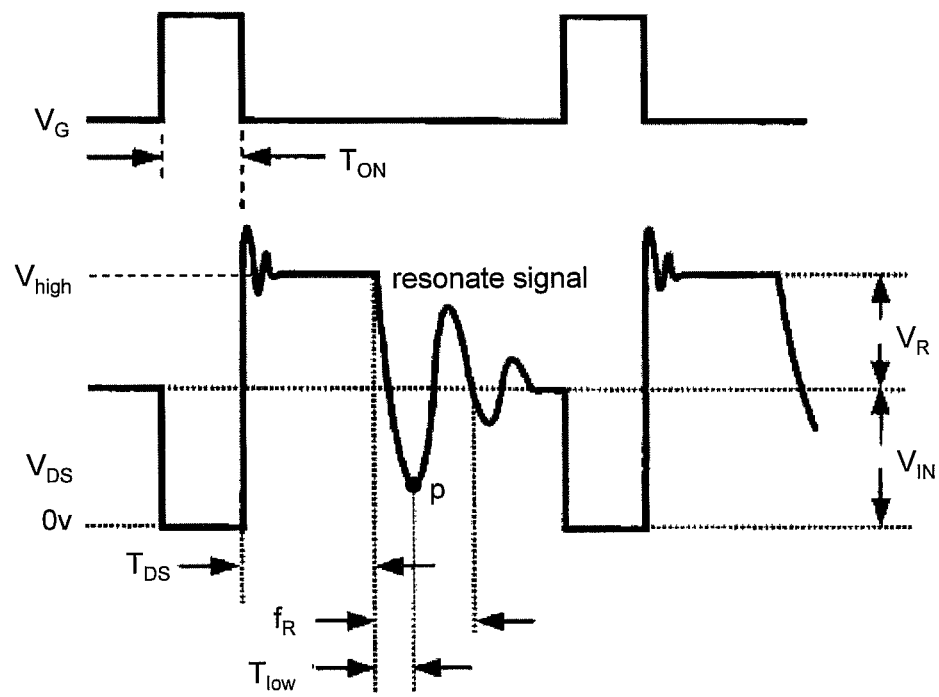
Figure 1B - Prior Art

MAXIMIZE EFFICIENCY METHOD FOR RESONANT CONVERTER WITH SELF-ADJUSTING SWITCHING POINTS

BACKGROUND OF THE INVENTION

1. Field of the Invention

The present invention relates to a maximize efficiency method. More specifically, the present invention discloses a maximize efficiency method for resonant converter with self-adjusting switching points.

2. Description of the Prior Art

Power converters have transformers with primary and secondary windings in order to provide isolation. A switch such as a transistor is electrically coupled to the primary winding of the transformer. The switch controls the voltage transferring from the primary to the secondary winding. However, power loss occurs when the switch operates.

Refer to FIG. 1A, which is a schematic diagram illustrating a portion of a power converter circuit of the prior art and to FIG. 1B, which is a diagram illustrating voltages in the circuit of FIG. 1A.

The circuit 100 includes a transformer 110 having a primary winding PW and a secondary winding SW and a transistor 120 connected to the primary winding PW. An input voltage $V_{IN}$ is applied to the primary winding PW. A voltage $V_G$ is periodically applied ($T_{ON}$) to the gate of the transistor 120 to control the transfer of power from the primary winding PW to the secondary winding SW. When the transistor 120 is turned on, the energy is stored in the transformer 110. As the transistor 120 is turned off, the stored energy in the transformer 110 is discharged.

A reflected voltage $V_R$ is generated when the transistor 120 is turned off. As a result the voltage $V_{DS}$ across the transistor 120 equals the input voltage $V_{IN}$ plus the reflected voltage $V_R$. While the transistor 120 is turned off, a parasitic capacitor inherent in the transistor 120 stores the energy from the voltage $V_D$.

After a discharge period $T_{DS}$ the energy of the transformer 110 is fully discharge and the energy stored in the parasitic capacitor flows back to the input voltage $V_{IN}$ through the primary winding PW of the transformer 110.

The primary winding PW and the parasitic capacitor along with parasitic elements on the secondary winding create a resonant tank with a resonant frequency $f_R$. While resonating, energy flows back and forth between the primary winding PW and the parasitic capacitor.

An ideal time to turn on the transistor 120 is when the lowest voltage level occurs after a delay time $T_{low}$ in order to reduce turn ON power loss to a minimum.

Therefore there is need for a more effective method of controlling the switching device in order to reduce switching power loss.

SUMMARY OF THE INVENTION

To achieve these and other advantages and in order to overcome the disadvantages of the conventional method in accordance with the purpose of the invention as embodied and broadly described herein, the present invention provides a maximize efficiency method for resonant converter with self-adjusting switching points which reduces switching power loss.

The method of the present invention comprises determining the trigger time required to turn on the switch.

The present invention also measures the slope at the trigger time. This is used as a reference to adjust the next cycle's trigger time. If the slope is negative at the time of trigger, a delta time is added to the trigger time in the next cycle. If the slope is positive, a delta time is subtracted from the trigger time for the next cycle.

Specifically, the method of the present invention in a resonant converter, wherein the resonant converter comprises a transformer having a primary winding and a second winding and an N-channel metal oxide semiconductor field effect transistor (NMOSFET), and wherein the primary winding is connected a high voltage terminal and a drain of the NMOSFET, and a source of the NMOSFET is connected with a reflected voltage terminal. Firstly, the NMOSFET is turned on whereby first energy from the high voltage terminal is stored in the primary winding. Next, the NMOSFET is turned off whereby the first energy is discharged via the second winding to the load. After the transformer energy is completely discharged a first resonant signal is generated at the drain, wherein a voltage of the first resonant signal is gradually close to a high voltage of the high voltage terminal plus a reflected voltage of the reflected voltage terminal, wherein the high voltage plus the reflected voltage equals Vds, the voltage across the NMOSFET drain to source. While resonating, the Vds will oscillate around a mid-level voltage, and is hereby referred to as crossing voltage.

Then, a first period between a start time point and a cross time point of the first resonant signal is recorded when the voltage of the first resonant signal first reaches to the crossing voltage corresponding to the cross time point. Then, a slope of the first resonant signal is immediately measured after a prediction time equal to the first period. Then, the NMOSFET is turned on whereby second energy from the high voltage terminal is stored in the primary winding. The crossing voltage is selected at such a level where it is roughly the middle point between the peak and valley of an oscillation. This crossing voltage is typically at zero volts when measured at tertiary winding, but can be of any voltage at the PW since there is a voltage offset.

Then, the NMOSFET is turned off whereby the second energy is discharged from the secondary winding and a second resonant signal is generated at the drain, wherein a voltage of the second resonant signal is gradually close to the crossing voltage. Next, a slope of the second resonant signal is immediately measured after a second period, which depends on the first period, the prediction time, and a measurement result of the slope of the first resonant signal.

Then, a feedback process is executed. The feedback process comprises following steps. Firstly, the NMOSFET is turned on whereby third energy from the high voltage terminal is stored in the primary winding. Afterwards, the NMOSFET is turned off whereby the third energy is discharged from the second winding and a third resonant signal is generated at said drain, wherein a voltage of the third resonant signal is gradually close to the crossing voltage. Next, a slope of the third resonant signal is immediately measured after a third period, which depends on previous period passed and a measurement result of the slope of previous resonant signal at a preceding time.

Finally, the next step is repeating the feedback process.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1A is a schematic diagram illustrating a portion of a power converter circuit of the prior art;

FIG. 1B is a diagram illustrating voltages in the circuit of FIG. 1A;

DESCRIPTION OF THE PREFERRED EMBODIMENTS

Figure 2:
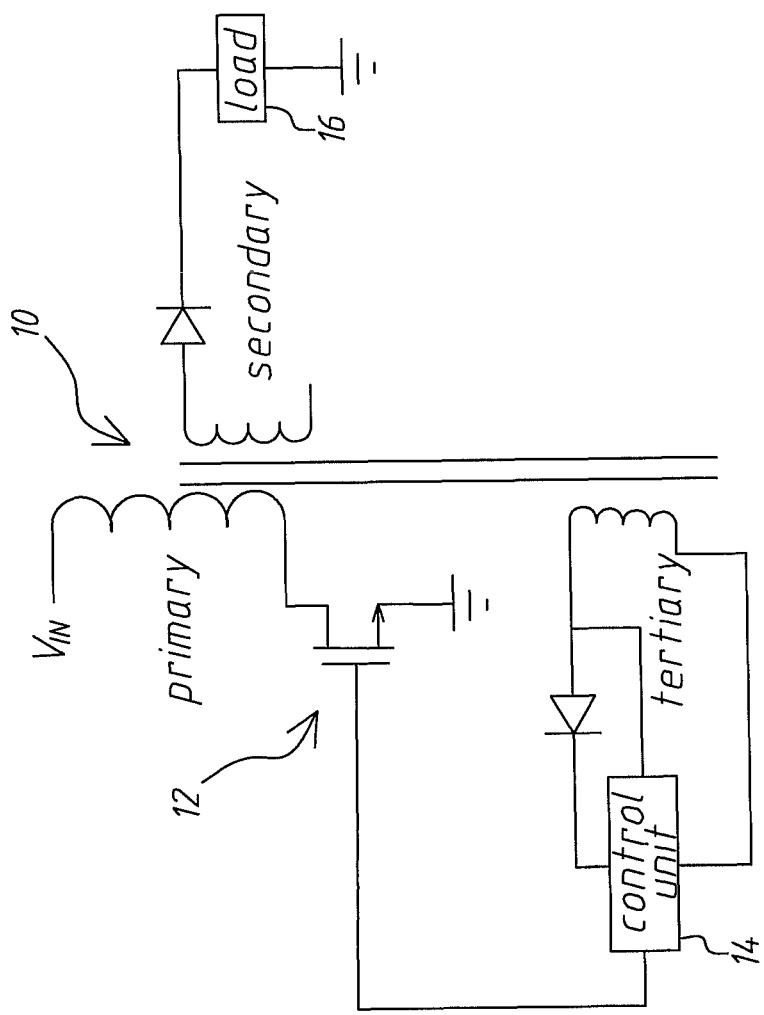
FIG. 2 is a schematic diagram illustrating a portion of a power converter circuit according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The present invention provides a maximize efficiency method for resonant converter with self-adjusting switching points which reduces switching power loss. The reason related to the method is introduced as below.

Refer to FIG. 1A and FIG. 1B. When the transistor is turned on, the $V_{DS}$ voltage is a grounding voltage. When the transistor is turned off and after the transformer energy is discharged, a resonant signal is generated at the drain of the transistor. The resonant signal is a sine wave signal whose voltage is gradually close to the $V_{IN}$ voltage. The voltage of the resonant signal begins to drop from the $V_{high}$ voltage corresponding to a start time point. When the voltage of the resonant signal first reaches the $V_{IN}$ voltage, the present time is defined as a cross time point. When the voltage of the resonant signal first reaches a valley voltage p, the present time is defined as a valley time point. A period between the start time point and the cross time point approximates to a period between the cross time point and the valley time point due to the sine wave signal. For reducing switching power loss, turning on the transistor at the valley time point of the resonant signal to obtain maximum efficiency.

Figure 3:
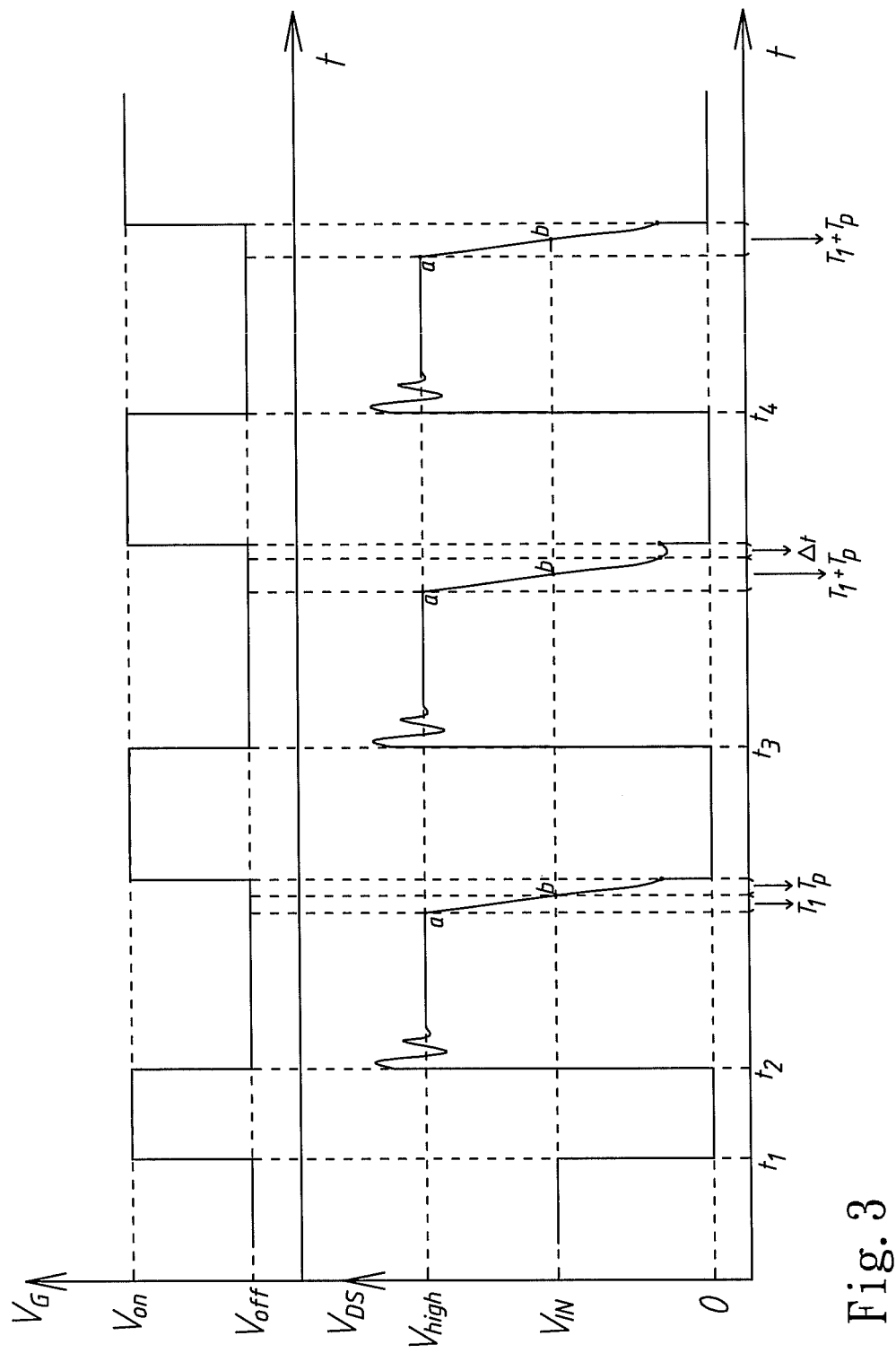
FIG. 3 is a diagram illustrating voltages in the circuit of FIG. 2.
Figure 4:
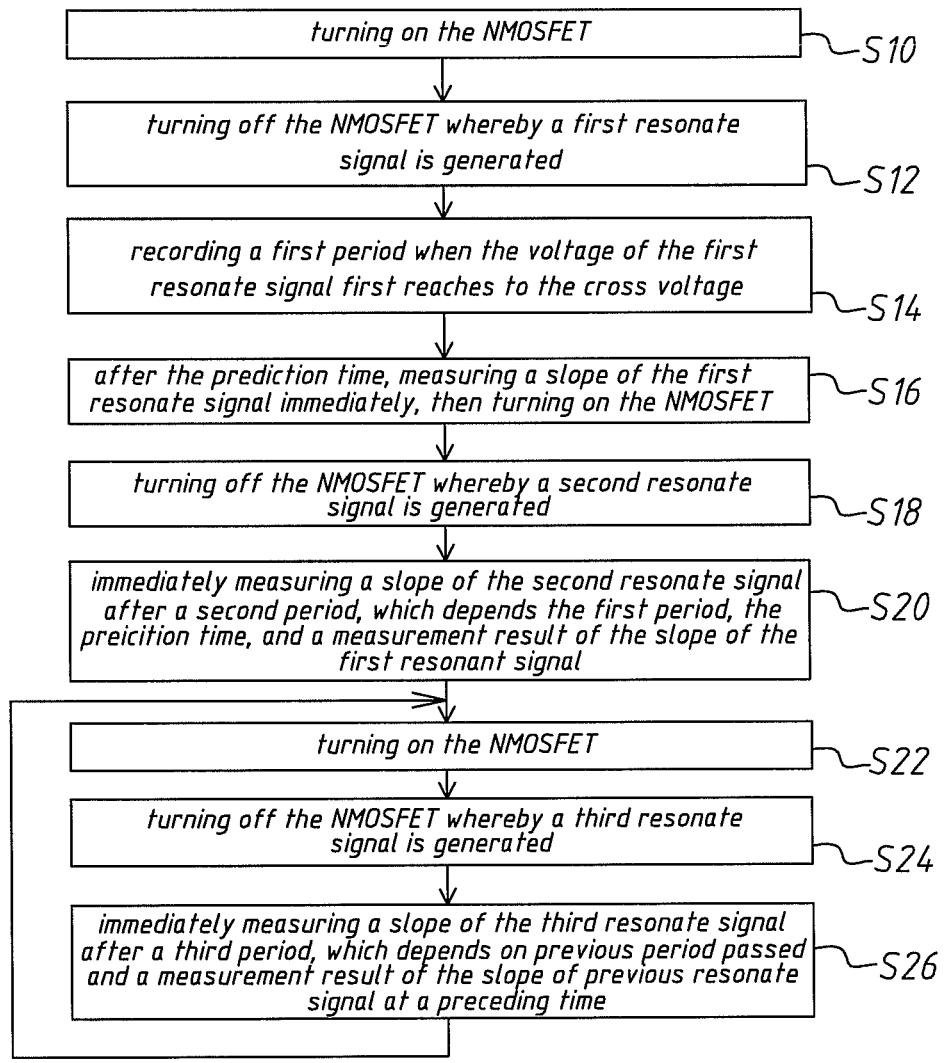
FIG. 4 is a flowchart illustrating a power loss reduction method related to FIG. 3 according to an embodiment of the present invention.

According to the above-mentioned reason, refer to FIG. 2, FIG. 3, and FIG. 4. A resonant converter is shown in FIG. 2. The resonant converter comprises a transformer 10 having a primary winding, a second winding, and a tertiary winding, and an N-channel metal oxide semiconductor field effect transistor (NMOSFET) 12, and wherein the primary winding is connected a high voltage terminal and a drain of the NMOSFET 12, and a source of the NMOSFET 12 is connected with a reflected voltage terminal. In the embodiment, a voltage of the reflected voltage terminal is a grounding voltage, which is used as an example. The secondary winding is connected with a load 16. The tertiary winding is connected with a control unit 14, and the control unit 14 is connected with a gate of the NMOSFET 12. The control unit 14 can detect the drain voltage of the NMOSFET 12 through the primary winding and the tertiary winding.

In Step S10, the control unit 14 turns on the NMOSFET 12 whereby first energy from the high voltage terminal is stored in the primary winding at time point $t_1$. Next, in Step S12, the control unit 14 turns off the NMOSFET 12 whereby the first energy is discharged via the second winding to the load 16. After the first energy is completely discharged, a first resonant signal is generated at the drain, wherein a voltage of first resonant signal is gradually close to a high voltage $V_{IN}$ of the high voltage terminal plus a reflected voltage of the reflected voltage terminal, and wherein the high voltage plus the reflected voltage equals Vds, the voltage across the NMOSFET 12 drain to source. While resonating, the Vds will oscillate around a mid-level voltage, and hereby referred to as a crossing voltage. In this embodiment, the crossing voltage is the high voltage $V_{IN}$ since the reflected voltage terminal is grounded. The voltage of the first resonant signal begins to drop from the $V_{high}$ voltage corresponding to a start time point a.

Then, in Step S14, the control unit 14 records a first period $T_1$ between the start time point a and a cross time point b of the first resonant signal when the voltage of the first resonant signal first reaches to the crossing voltage corresponding to the cross time point b. Afterward, in Step S16, after a prediction time $T_p$ equal to the first period $T_1$, a slope of the first resonant signal is immediately measured by the control unit 14. Then, the control unit 14 turns on the NMOSFET 12 whereby second energy from the high voltage terminal is stored in the primary winding. Thereby, the switching power loss of the NMOSFET 12 is reduced.

For finding the first valley of the resonant signal, the following steps are executed. In Step S18, the control unit 14 turns off the NMOSFET 12 whereby the second energy is discharged via the second winding to the load 16. After the second energy is completely discharged, a second resonant signal is generated at the drain. Since resonant properties of the second resonant signal are identical to that of the first resonant signal, a voltage of the second resonant signal is gradually close to the crossing voltage. Next, in Step S20, the control unit 14 immediately measures a slope of the second resonant signal after a second period $T_2$, which depends on the first period $T_1$, the prediction time $T_p$, and a measurement result of the slope of the first resonant signal. When the slope measured of the first resonant signal is negative, the second period $T_2$ equals to a sum of the first period $T_1$, the prediction time $T_p$, and a positive offset time $+\Delta t$; when the slope measured of the first resonant signal is positive, the second period $T_2$ equals to a sum of the first period $T_1$, the prediction time $T_p$, and a negative offset time $-\Delta t$. An absolute of the positive offset time is the same to that of the negative offset time. Besides, when the slope measured of the first resonant signal is zero, the second period $T_2$ equals to a sum of the first period $T_1$ and the prediction time $T_p$. In this embodiment, the slope measured of the first resonant signal is assumed to be negative, it can be positive. In other words, the second period $T_2 = T_1 + T_p + \Delta t$.

Next, in Step S22, the control unit 14 turns on the NMOSFET 12 whereby third energy from the high voltage terminal is stored in the primary winding. Then, in Step S24, the control unit 14 turns off the NMOSFET 12 whereby third energy is discharged via the second winding to the load 16. After the third energy is completely discharged, a third resonant signal is generated at the drain. Since the resonant properties of the third resonant signal are identical to that of the first resonant signal, a voltage of the third resonant signal is gradually close to the crossing voltage. Next, in Step S26, the control unit 14 immediately measures a slope of the third resonant signal after a third period $T_3$, which depends on the previous period passed and a measurement result of the slope of the previous resonant signal at a preceding time. When the slope measured of the previous resonant signal at the preceding time is negative, the third period $T_3$ equals to a sum of the previous period passed at the preceding time and the positive offset time $+\Delta t$; when the slope measured of the previous resonant signal at the preceding time is positive, the third period $T_3$ equals to a sum of the previous period passed at the preceding time and the negative offset time $-\Delta t$. Besides, when the slope measured of the previous resonant signal at the preceding time is zero, the third period $T_3$ equals to the previous period passed at the preceding time. Finally, the next step is returning to the Step S22.

Specifically, in Step 26, the third period $T_3$ depends on the second period $T_2$ and a measurement result of the slope of the second resonant signal. When the slope measured of the second resonant signal is negative, the third period $T_3$ equals to a sum of the second period $T_2$ and the positive offset time $+\Delta t$; when the slope measured of the second resonant signal is positive, the third period $T_3$ equals to a sum of the second period $T_2$ and the negative offset time $-\Delta t$; and when the slope measured of the second resonant signal is zero, the third period $T_3$ equals to the second period $T_2$. In this embodiment, if the slope measured of the second resonant signal is positive, as a result, the third period $T_3=T_2-\Delta t=T_1+T_p+\Delta t-\Delta t=T_1+T_p$. If the slope measured of the second resonant signal is still negative, as a result, the third period $T_3=T_2+\Delta t=T_1+T_p+2\Delta t$, this process continues indefinitely, so as to the slope at the point of measurement (NMOSFET turning ON) is to be near zero.

In the above-mentioned process, the Step S18 and the steps below can be omitted. Alternatively, the Step S22 and the steps below can be omitted. The goal of reducing switching power loss is still achieved.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A maximize efficiency method for resonant converter with self-adjusting switching points, wherein said resonant converter comprises a transformer having a primary winding and a second winding and an N-channel metal oxide semiconductor field effect transistor (NMOSFET), and wherein said primary winding is connected a high voltage terminal and a drain of said NMOSFET, and a source of said NMOSFET is connected with a reflected voltage terminal;
said method comprising steps of:
  Step (A): turning on said NMOSFET whereby first energy from said high voltage terminal is stored in said primary winding;
  Step (B): turning off said NMOSFET whereby said first energy is discharged from said second winding and a first resonant signal is generated at said drain, wherein a voltage of said first resonant signal is gradually close to a high voltage of said high voltage terminal plus a reflected voltage of said reflected voltage terminal, wherein said high voltage plus said reflected voltage equals a crossing voltage;
  Step (C): recording a first period between a start time point and a cross time point of said first resonant signal when said voltage of said first resonant signal first reaches to said crossing voltage corresponding to said cross time point; and
  Step (D): turning on said NMOSFET after a prediction time equal to said first period.

2. The maximize efficiency method for resonant converter with self-adjusting switching points of claim 1, wherein in Step (D), after said prediction time, measuring a slope of said first resonant signal immediately, then turning on said NMOSFET whereby second energy from said high voltage terminal is stored in said primary winding.

3. The maximize efficiency method for resonant converter with self-adjusting switching points of claim 2, further comprising steps of:
  Step (E): turning off said NMOSFET whereby said second energy is discharged from said second winding and a second resonant signal is generated at said drain, wherein a voltage of said second resonant signal is gradually close to said crossing voltage; and
  Step (F): immediately measuring a slope of said second resonant signal after a second period, which depends on said first period, said prediction time, and a measurement result of said slope of said first resonant signal.

4. The maximize efficiency method for resonant converter with self-adjusting switching points of claim 3, wherein when said slope measured of said first resonant signal is negative, said second period equals to a sum of said first period, said prediction time, and a positive offset time.

5. The maximize efficiency method for resonant converter with self-adjusting switching points of claim 3, wherein when said slope measured of said first resonant signal is positive, said second period equals to a sum of said first period, said prediction time, and a negative offset time.

6. The maximize efficiency method for resonant converter with self-adjusting switching points of claim 3, wherein when said slope measured of said first resonant signal is zero, said second period equals to a sum of said first period and said prediction time.

7. The maximize efficiency method for resonant converter with self-adjusting switching points of claim 3, further comprising steps of:
  Step (G): turning on said NMOSFET whereby third energy from said high voltage terminal is stored in said primary winding;
  Step (H): turning off said NMOSFET whereby said third energy is discharged from said second winding and a third resonant signal is generated at said drain, wherein a voltage of said third resonant signal is gradually close to said crossing voltage;
  Step (I): immediately measuring a slope of said third resonant signal after a third period, which depends on previous said period passed and a measurement result of said slope of previous said resonant signal at a preceding time; and
  Step (J): returning to Step (G).

8. The maximize efficiency method for resonant converter with self-adjusting switching points of claim 7, wherein when said slope measured of said previous said resonant signal at said preceding time is negative, said third period equals to a sum of said previous said period passed at said preceding time and a positive offset time.

9. The maximize efficiency method for resonant converter with self-adjusting switching points of claim 7, when said slope measured of said previous said resonant signal at said preceding time is positive, said third period equals to a sum of said previous said period passed at said preceding time and a negative offset time.

10. The maximize efficiency method for resonant converter with self-adjusting switching points of claim 7, when said slope measured of said previous said resonant signal at said preceding time is zero, said third period equals to said previous said period passed at said preceding time.

11. The maximize efficiency method for resonant converter with self-adjusting switching points of claim 7, wherein in Step (I), said third period depends on said second period and a measurement result of said slope of said second resonant signal.

12. The maximize efficiency method for resonant converter with self-adjusting switching points of claim 11, wherein when said slope measured of said second resonant signal is negative, said third period equals to a sum of said second period and a positive offset time.

13. The maximize efficiency method for resonant converter with self-adjusting switching points of claim 11, wherein when said slope measured of said second resonant signal is positive, said third period equals to a sum of said second period and a negative offset time.

14. The maximize efficiency method for resonant converter with self-adjusting switching points of claim 11, wherein when said slope measured of said second resonant signal is zero, said third period equals to said second period.

15. The maximize efficiency method for resonant converter with self-adjusting switching points of claim 1, wherein said reflected voltage terminal is grounded and said reflected voltage is a grounding voltage.

\* \* \* \* \*